US00RE42692E

(19) United States
(12) Reissued Patent
Frederiksen et al.

(10) Patent Number: US RE42,692 E
(45) Date of Reissued Patent: Sep. 13, 2011

(54) METHOD FOR COMPACT REPRESENTATION OF MULTI-CODE SIGNALING IN COMMUNICATION SYSTEMS

(75) Inventors: Frank Frederiksen, Klarup (DK); Troels Emil Kolding, Klarup (DK)

(73) Assignee: Nokia Corporation, Espoo (FI)

(21) Appl. No.: 12/379,600

(22) Filed: Feb. 25, 2009

Related U.S. Patent Documents

Reissue of:
(64) Patent No.: 7,321,576
Issued: Jan. 22, 2008
Appl. No.: 10/157,159
Filed: May 30, 2002

U.S. Applications:
(60) Provisional application No. 60/331,391, filed on Nov. 15, 2001.

(51) Int. Cl.
*H04B 7/216* (2006.01)

(52) U.S. Cl. ..... 370/335; 370/441; 455/450

(58) Field of Classification Search ..... None
See application file for complete search history.

(56) References Cited

U.S. PATENT DOCUMENTS

| | | | |
|---|---|---|---|
| 6,163,524 | A | 12/2000 | Magnusson et al. |
| 6,359,876 | B1 | 3/2002 | Kamata |
| 6,493,376 | B1 | 12/2002 | Harms et al. |
| 6,631,125 | B1 | 10/2003 | Longoni et al. |
| 6,741,578 | B1 | 5/2004 | Moon et al. |
| 6,775,318 | B2 | 8/2004 | Chen et al. |
| 6,836,469 | B1 | 12/2004 | Wu |
| 6,873,647 | B1 | 3/2005 | Tiedemann et al. |
| 6,876,690 | B1 | 4/2005 | Imbeni et al. |
| 6,885,691 | B1 | 4/2005 | Lyu |
| 6,975,615 | B1 | 12/2005 | Toskala et al. |
| 7,006,428 | B2 | 2/2006 | Proctor et al. |
| 7,054,293 | B2 | 5/2006 | Tiedemann et al. |
| 7,120,133 | B1 * | 10/2006 | Joo et al. ..... 370/328 |

FOREIGN PATENT DOCUMENTS

JP 2003-143108 5/2003

OTHER PUBLICATIONS

Motorola, "HSDPA Signaling Requirements", TSG-RAN Working Group 2, R2-A1010015, Edinburgh, UK, Jan. 15-19, 2001.

Nokia, "HSDPA Related Signaling Parameters in Downlink", Version 2, TSG-RAN Working Group 2, Meeting #21, XP-002291723, Busan, Korea, May 21-25, 2001.

(Continued)

*Primary Examiner* — Anh-Vu Ly

(74) *Attorney, Agent, or Firm* — Squire, Sanders & Dempsey, LLP

(57) ABSTRACT

A method for compact representation of multi-code signaling that includes determining a number of multi-codes and a code offset. A codeword is formulated that includes a code group indicator and an offset indicator. The codeword represents a compact representation of multi-code signaling and is formulated and may be decoded without the need for a look-up table.

35 Claims, 4 Drawing Sheets

OTHER PUBLICATIONS

Samsung Electronics, "DL Signaling for HSDPA", TSG-RAN Working Group 1, Meeting #21, R1-01-0874, Turin, Italy, Aug. 27-31, 2001.
Nokia, "Compact Signalling of Multi-Code Allocation for HSDPA", 3GPP TSG RAN Working Group 1, Meeting #22, XP 002291721, Jeju, Korea, Nov. 19-23, 2001.
Nokia, "Compact Signalling of Multi-Code Allocation for HSDPA, Version 2", 3GPP TSG RAN Working Group 1, Meeting #23, XP 002291722, Espoo, Finland, Jan. 8-11, 2002.
Qualcomm, "DL Control Structure for HS-PDSCH", 3GPP TSG-RAN Working Group 1, Meeting #20, XP 002291725, Busan, Korea, May 21-25, 2001.
Motorola, "Associated Signaling Requirements for High Speed DSCH (HS-DSCH)", TSG-RAN Working Group 1, Meeting #20, XP 002291726, Busan, Korea, May 21-25, 2001.
Ericsson, "Signaling Requirements for HS-DSCH", 3GPP TSG-RAN Working Group 1, Meeting #20, XP 002291727, Busan, Korea, May 21-25, 2001.

* cited by examiner

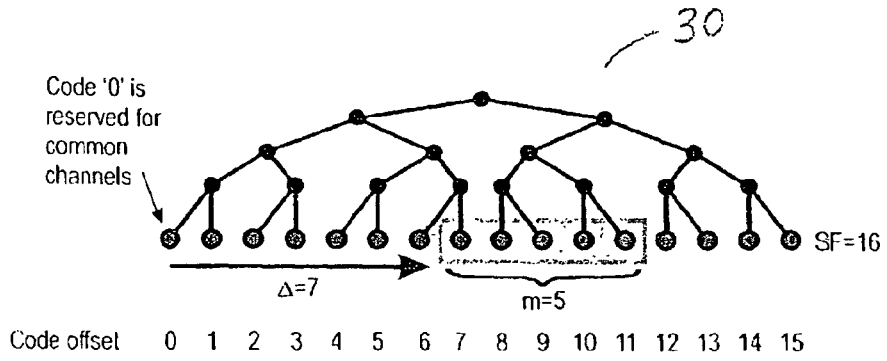

FIG. 2

Tree offset indicator (4 bits)

| Cluster code indicator (3 bits) | 0 | 1 | 2 | 3 | 4 | 5 | 6 | 7 | 8 | 9 | 10 | 11 | 12 | 13 | 14 | 15 |
|---|---|---|---|---|---|---|---|---|---|---|---|---|---|---|---|---|
| 0 (1/15) | 1<br>1 | 1<br>2 | 1<br>3 | 1<br>4 | 1<br>5 | 1<br>6 | 1<br>7 | 1<br>8 | 1<br>9 | 1<br>10 | 1<br>11 | 1<br>12 | 1<br>13 | 1<br>14 | 1<br>15 | 15<br>1 |
| 1 (2/14) | 2<br>1 | 2<br>2 | 2<br>3 | 2<br>4 | 2<br>5 | 2<br>6 | 2<br>7 | 2<br>8 | 2<br>9 | 2<br>10 | 2<br>11 | 2<br>12 | 2<br>13 | 2<br>14 | 14<br>2 | 14<br>1 |
| 2 (3/13) | 3<br>1 | 3<br>2 | 3<br>3 | 3<br>4 | 3<br>5 | 3<br>6 | 3<br>7 | 3<br>8 | 3<br>9 | 3<br>10 | 3<br>11 | 3<br>12 | 3<br>13 | 13<br>3 | 13<br>2 | 13<br>1 |
| 3 (4/12) | 4<br>1 | 4<br>2 | 4<br>3 | 4<br>4 | 4<br>5 | 4<br>6 | 4<br>7 | 4<br>8 | 4<br>9 | 4<br>10 | 4<br>11 | 4<br>12 | 12<br>4 | 12<br>3 | 12<br>2 | 12<br>1 |
| 4 (5/11) | 5<br>1 | 5<br>2 | 5<br>3 | 5<br>4 | 5<br>5 | 5<br>6 | 5<br>7 | 5<br>8 | 5<br>9 | 5<br>10 | 5<br>11 | 11<br>5 | 11<br>4 | 11<br>3 | 11<br>2 | 11<br>1 |
| 5 (6/10) | 6<br>1 | 6<br>2 | 6<br>3 | 6<br>4 | 6<br>5 | 6<br>6 | 6<br>7 | 6<br>8 | 6<br>9 | 6<br>10 | 10<br>6 | 10<br>5 | 10<br>4 | 10<br>3 | 10<br>2 | 10<br>1 |
| 6 (7/9) | 7<br>1 | 7<br>2 | 7<br>3 | 7<br>4 | 7<br>5 | 7<br>6 | 7<br>7 | 7<br>8 | 7<br>9 | 9<br>7 | 9<br>6 | 9<br>5 | 9<br>4 | 9<br>3 | 9<br>2 | 9<br>1 |
| 7 (8/8) | | | | | | | | | 8<br>8 | 8<br>7 | 8<br>6 | 8<br>5 | 8<br>4 | 8<br>3 | 8<br>2 | 8<br>1 |

Decoding notation m — Number of multi-codes

Δ — Offset from left/right in code tree (SF=16)

FIG. 3

METHOD FOR COMPACT REPRESENTATION OF MULTI-CODE SIGNALING IN COMMUNICATION SYSTEMS

Matter enclosed in heavy brackets [ ] appears in the original patent but forms no part of this reissue specification; matter printed in italics indicates the additions made by reissue.

The present invention claims the benefit of Provisional Patent application Ser. No. 60/331,391 filed Nov. 15, 2001, the contents contained therein being incorporated by reference herein in its entirety.

BACKGROUND

1. Field of the Invention

This invention relates to multi-code signaling, and more specifically to compact representation of multi-code signaling in communication systems.

2. Discussion of the Related Art

For some communication systems, WCDMA (Wideband Code Division Multiple Access) is used as the access technique. In order to improve the data rate for a single user, this user may be allowed to utilize several spreading codes (multi-code operation). One specific area, where this multi-code operation is utilized is in HSDPA (High Speed Downlink Packet Access), where the user's spreading factor is set to the fixed number of 16.

For HSDPA, a base station needs to signal to the mobile node or user equipment (UE) exactly how many multi-codes have been allocated and at which offset the set of codes begin (all defined at spreading factor 16 level). It is assumed that only clusters of consecutive codes are allocated to one user at a time.

In general, up to 15 multi-codes may be supported by the most capable UEs and for the single-code case there is up to 15 different code offsets possible since a single code (offset 0) is reserved to the common channels P-CPICH/P-CCPCH. Commonly, 4 bits are used in order to represent number of multi-codes and 4 bits are used in order to represent the code tree offset. Hence, altogether 2×4=8 bits are needed to make full-flexibility signaling.

Some have proposed that only a subset of multi-code allocations should be allowed thereby enabling a representation by fewer bits, e.g., down to 5 bits. However, since more flexibility with respect to multi-code utilization leads to a better spectral efficiency as well as higher RRM flexibility (QoS, code/time multiplexing), it is desirable to only limit the possible multi-code set as little as possible; preferably not at all.

Some combinations of multi-code number and code offsets are not possible. For example, if 15 multi-codes are allocated to a user there is only one possible offset combination. In total there is only 120 combinations. By building a lookup table with the possible combinations, 120 combinations can be represented using 7 bits. However, the major drawback of the lookup table method is that it requires additional memory at the UE side to decode the received information.

Some have also proposed that instead of indicating the starting position and the number of codes, that the code assignment information is only reported among the possible combinations of code allocation as an alternative means of preserving full flexibility while reducing the number of bits.

However, this method leads to conditioned signaling which should be avoided when possible.

It has also been suggested to reduce the number of possible multi-codes such that for instance 1, 5, 10 and 15 multi-codes are the only options that are available. This solution will require 6 bits for the signaling, but at the cost of less flexibility in the code allocation.

Therefore a need exists for reducing the signaling overhead using bit-efficient ways of signaling while maintaining performance and flexibility.

SUMMARY OF THE INVENTION

The present invention relates to a method for compact representation of multi-code signaling that includes: determining a number of multi-codes, determining a code offset, and formulating a codeword that includes a code group indicator and an offset indicator. The codeword represents a compact representation of multi-code signaling and is formulated and may be decoded without the need for a look-up table.

The formulating a codeword may include: determining a first term where the first term is a minimum of the multi-code number and sixteen minus the multi-code number; determining a first part of a codeword by subtracting one from the first term where the first part represents the code group indicator; determining a second term where the second term is equal to zero if seven is larger than or equal to the multi-code number or equal to one if the multi-code number is larger than seven; determining a third term by calculating a fourth term by multiplying the second term by fifteen and subtracting the fourth term from the code offset minus one; determining a second part of the codeword by taking an absolute value of the third term where the second part represents the offset indicator; and forming the codeword by concatenating the first part of the codeword with the second part of the codeword.

Moreover, the present invention relates to a method for decoding a multi-code signaling codeword that includes: identifying a codeword where the codeword includes a code group indicator and an offset indicator; determining a number of multi-codes from the codeword; and determining a code offset from the codeword. The number multi-codes and corresponding code offset may be determined without the need for a look-up table.

The decoding a multi-code signaling codeword may include: identifying a first part and a second part of a codeword where the first part represents the code group indicator and the second part represents the offset indicator; calculating a first term, the first term equal to one if the second part is larger than or equal to the first part subtracted from fifteen, else the first term is equal to zero; calculating a second term by multiplying the first term by sixteen; identifying a number of multi-codes by taking an absolute value of the first part plus one minus the second term; calculating a third term, the third term equal to one if the number of multi-codes is larger than or equal to eight, else the third term is equal to zero; calculating a fourth term by multiplying the third term by seventeen; and identifying a code offset by taking an absolute value of the second part plus one minus the fourth term.

The present invention is further related to a system for compact representation of multi-code signaling that includes a network, a base station operably connected to the network, and a network device operably connected to the base station via the network. The base station determines a number of multi-codes and a code offset for use by the network device. The base station encodes the number of multi-codes and code offset into a codeword comprising a compact representation of multi-code signaling. The codeword is encodable by the base station and decodable by the remote device without the need for a look-up table.

In addition, the present invention is related to a mobile device capable of receiving a codeword representing multi-code signaling where the mobile device contains hardware or software that performs: identifying a first part and a second part of the codeword where the first part represents the code group indicator and the second part representing the offset indicator; calculating a first term, the first term equal to one if the second part is larger than or equal to the first part subtracted from fifteen, else the first term is equal to zero; calculating a second term by multiplying the first term by sixteen; identifying a number of multi-codes by taking an absolute value of the first part plus one minus the second term; calculating a third term, the third term equal to one if the number of multi-codes is larger than or equal to eight, else the third term is equal to zero; calculating a fourth term by multiplying the third term by seventeen; and identifying a code offset by taking an absolute value of the second part plus one minus the fourth term.

BRIEF DESCRIPTION OF THE DRAWINGS

The present invention is further described in the detailed description which follows in reference to the noted plurality of drawings by way of non-limiting examples of embodiments of the present invention in which like reference numerals represent similar parts throughout the several views of the drawings and wherein:

FIG. 2 is a diagram of a code allocation according to an example embodiment of the present invention;

FIG. 3 is a diagram of a total encoding matrix for signaling multi-code allocation according to an example embodiment of the present invention;

DETAILED DESCRIPTION

Figure 1:
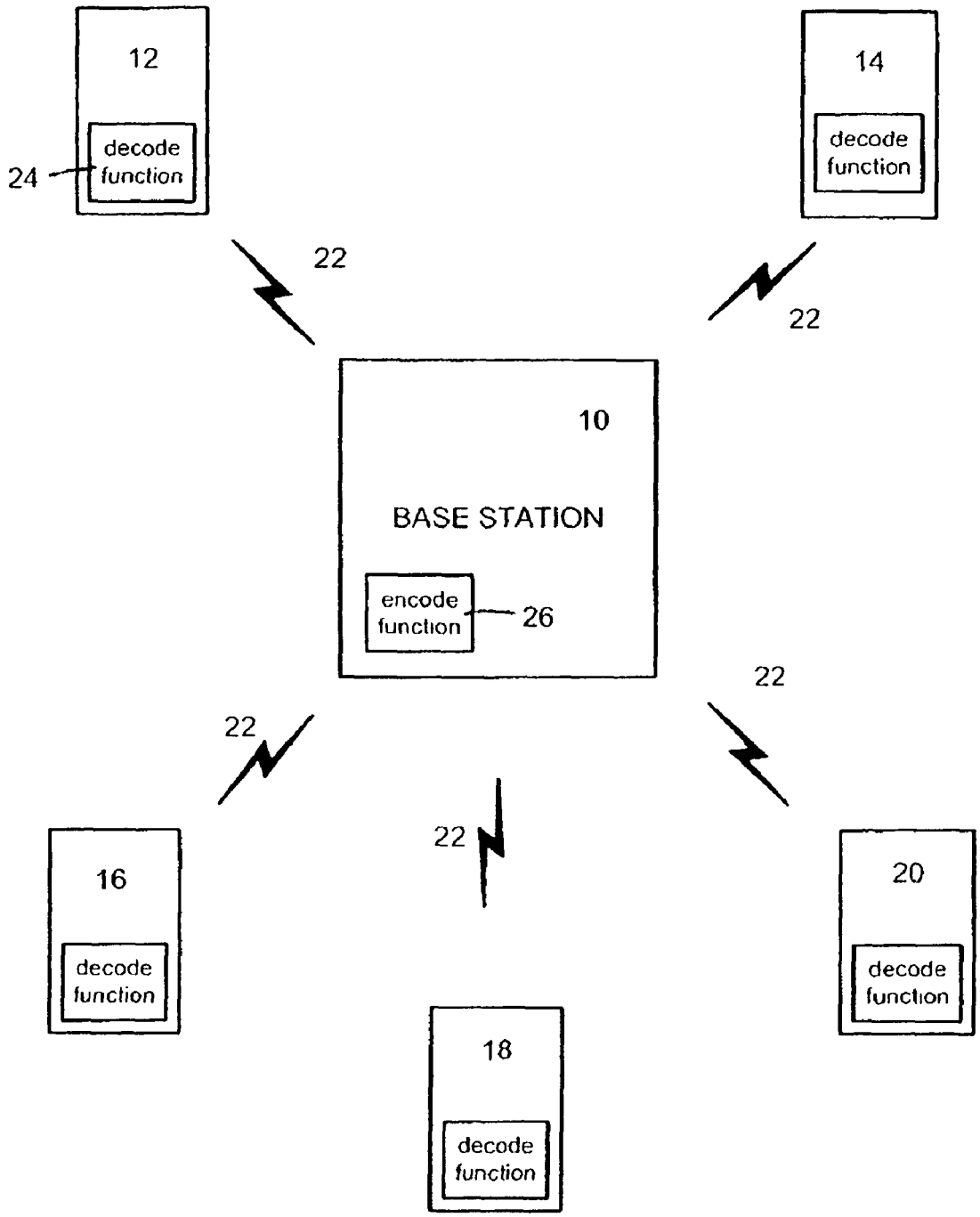
FIG. 1 is a block diagram of a system for compact representation of multi-code signaling according to an example embodiment of the present invention.

The particulars shown herein are by way of example and for purposes of illustrative discussion of the embodiments of the present invention. The description taken with the drawings make it apparent to those skilled in the art how the present invention may be embodied in practice.

Further, arrangements may be shown in block diagram form in order to avoid obscuring the invention, and also in view of the fact that specifics with respect to implementation of such block diagram arrangements is highly dependent upon the platform within which the present invention is to be implemented, i.e., specifics should be well within purview of one skilled in the art. Where specific details (e.g., circuits, flowcharts) are set forth in order to describe example embodiments of the invention, it should be apparent to one skilled in the art that the invention can be practiced without these specific details. Finally, it should be apparent that any combination of hard-wired circuitry and software instructions can be used to implement embodiments of the present invention, i.e., the present invention is not limited to any specific combination of hardware circuitry and software instructions.

Although example embodiments of the present invention may be described using an example system block diagram in an example host unit environment, practice of the invention is not limited thereto, i.e., the invention may be able to be practiced with other types of systems, and in other types of environments.

Reference in the specification to "one embodiment" or "an embodiment" means that a particular feature, structure, or characteristic described in connection with the embodiment is included in at least one embodiment of the invention. The appearances of the phrase "in one embodiment" in various places in the specification are not necessarily all referring to the same embodiment.

The present invention relates to an efficient way to optimize the signaling of the number of codes used and the offset into the code tree. The method may be applied to systems where the spreading factor may be 16, or to systems with a spreading factor different from 16, while still maintaining encoding efficiency. According to the present invention, in order to signal which code and offset is used for a communication link, data may be packed into a self-decodable structure, which eliminates the need for a look-up table. The present invention provides a signaling-efficient method that allows full multi-code flexibility and on-the-fly encoding and decoding. It may be based on the number of multi-codes and the code offset which leads to direct and consistent signaling.

The present invention may be useful and implemented in many applications such as WCDMA (Wideband Code Division Multiple Access) and specifically HSDPA (High Speed Downlink Packet Access). In this regard, channelization code set information may be sent over a HS-SCCH (High Speed Shared Control Channel) for a High Speed Downlink Shared Channel (HS-DSCH). Orthogonal Variable Spreading Factor (OVSF) codes may be allocated in such as way that they are positioned in sequence in the code tree. Therefore, according to the present invention, a number of multi-codes M starting at an offset P may be allocated for a given HS-DSCH and signaled on the HS-SCCH where M and P may be encoded using only three bits for the code group indicator and four bits for the code offset indicator for a total of seven bits, one less than conventional methods.

FIG. 1 shows a block diagram of a system for compact representation of multi-code signaling according to an example embodiment of the present invention. A base station 10 may communicate with one or more network devices 12-20 over a network 22. In this example embodiment, network 22 is a wireless network and network devices 12-20 may be wireless devices. However, the present invention may be implemented in a network that is wired or wireless. The network devices may be wireless devices such as a mobile phone, portable computer, Personal Digital Assistant (PDA), etc., or may be workstations, servers, etc.

Whenever base station 10 needs to communicate with a network device 12-20, the base station 10 determines how many multi-codes to allocate for the communication. The base station 10 may then send information to the network device notifying the network device how many multi-codes will be used for the communication, and at what code offset in a code tree the multi-codes start. The base station 10 may make its decision on how many multi-codes may be allocated to a particular network device or user depending on various factors, for example, how much information will be transferred from the base station to the user, what other activities are occurring at the base station, how much power the base station and/or the network device has available, what codes in the code tree are free or being used, etc. The base station 10 may encode the number of multi-codes and code offset information using an encoding function 24. Each network device 12-20 may include a decoding function 26 to decode the codeword from the base station 10 and extract the number of multi-codes and code offset information. Base station 10 and network devices 12-20 may all contain both encoding functions and/or decoding functions. The encoding functions and/or decoding functions may be implemented in hardware, software, microcode, or a combination thereof.

FIG. 2 shows a diagram of a code allocation according to an example embodiment of the present invention. A code tree 30 shows a spreading factor of 16 where 15 multi-codes are available to be allocated to one or more users. A base station that communicates with the user or network device determines how many multi-codes and at what code offset may be given to a user. The base station may send this information to the user in a codeword. In this example embodiment, codes at offsets 7-11 have been allocated to one user. These codes are all consecutive. Thus, the user or network device has been allocated five multi-codes starting at code offset 7 by a base station. According to the present invention, this information may be sent to the user in a codeword comprising a reduced number of bits, e.g., seven bits. A first part of the codeword may contain a code group indicator and a second part of the codeword may contain an offset indicator. The present invention is not limited by the order that the code group indicator and the offset indicator may appear in the codeword since this may be implementation dependent.

FIG. 3 shows a diagram of a total encoding matrix for signaling multi-code allocation according to an example embodiment of the present invention. The matrix shows a pair of numbers, one on top representing the number of multi-codes, and one on bottom representing an offset from left to right in the code tree. The associated code indicators are shown on the left side of the matrix vertically, and the associated offset indicators are shown on top of the matrix horizontally.

In methods for compact representation of multi-code signaling according to the present invention, multi-codes are clustered with a total number of possible offset combinations of 15. In this sense, the 1 multi-code and 15 multi-code situations are grouped together as one, the 2 multi-code situation is grouped with the 14 multi-code operation, and so forth. Thus, a total of eight groups are formed (1/15, 2/14, 3/13, 4/12, 5/11, 6/10, 7/9, and 8/8) which can be represented by 3-bit signaling. The next issue is then to identify which of the two code situations is active and what is the exact code offset. This aspect is achieved by utilizing that the total number of code-offsets is 16 for each cluster allowing a 4-bit representation.

Methods for compact representation of multi-code signaling according to the present invention may be implemented in many was to achieve a codeword containing the code indicator information and code offset information in less than eight bits. The following details an example possible encoding process according to the present invention where a codeword is needed to signal m multi-codes with code-offset Δ. The first portion of the codeword, CW1, may represent a code group indicator. The second portion of the codeword, CW2, may represent a tree offset indicator. Equation 1 may be used to encode the code group indicator and equation 2 may be used to encode the tree offset indicator.

$$\text{Three first bits: } CW1=\min(m,16-m)-1 \quad (1))$$

$$\text{Four last bits: } CW2=|\Delta-1-(m>7)*15| \quad (2)$$

The "min" outside of the parenthesis denotes that the minimum value of the two terms inside the parentheses (separated by a comma) is taken. The term (m>7) is either 1 or 0 depending on whether the condition is fulfilled or not, i.e., true is denoted by 1 and visa versa. The symbol "*" denotes a multiply operation. The two bars | denote that an absolute value is taken of the resultant value of the terms inside the two bars.

For example, a codeword needed to signal 12 multi-codes with code-offset 2 is:

$$CW1=\min(12,4)-1=3=\text{'011'}$$

$$CW2=|2-1-(12>7)*15|=14=\text{'1110'}$$

Therefore, the total codeword becomes '0111110' (or '1110011' depending on implementation). This codeword may be sent from a base station to a network device.

Figure 4:
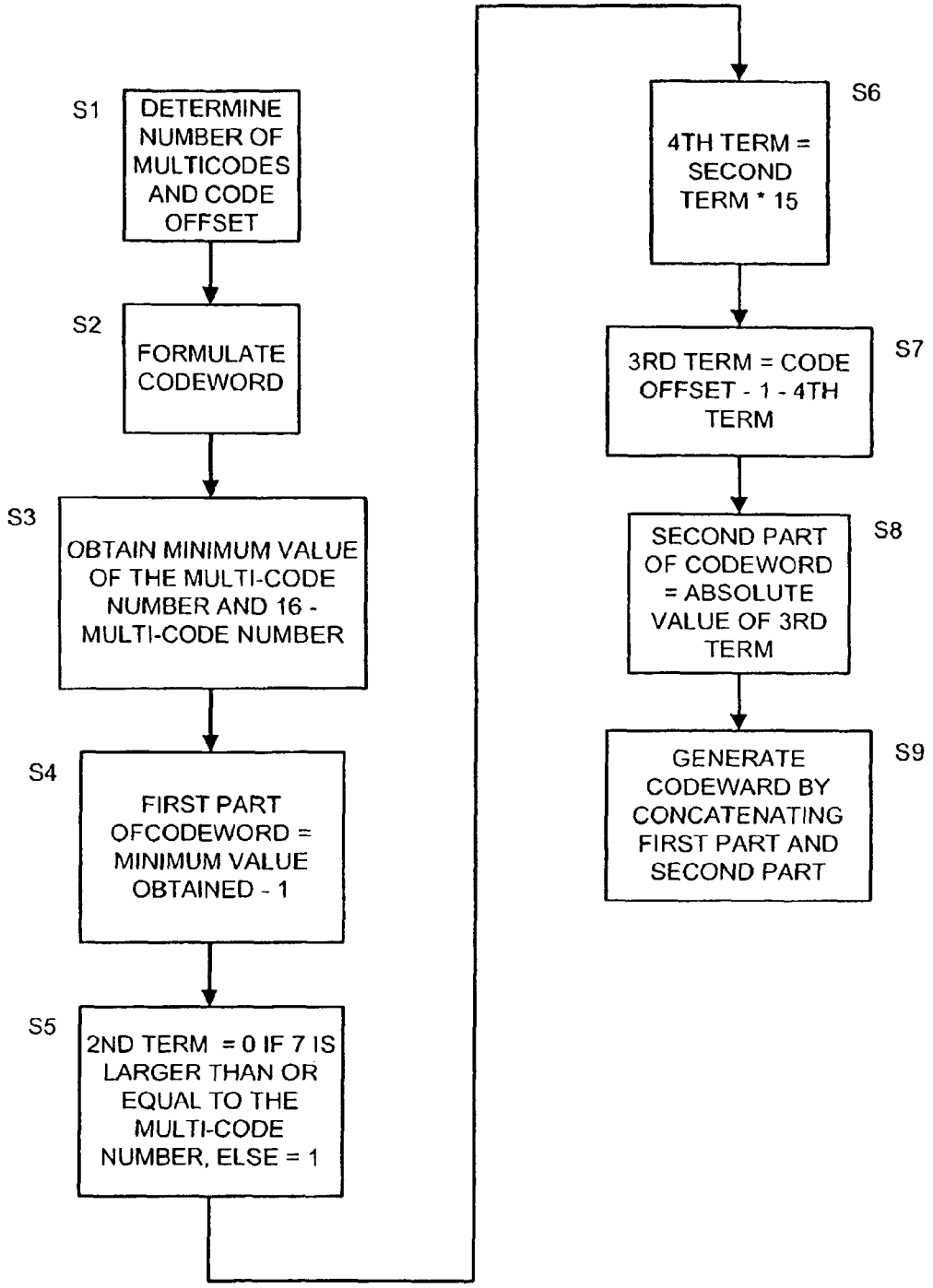
FIG. 4 is a flowchart of an encoding process according to an example embodiment of the present invention.

FIG. 4 shows a flowchart of an encoding process according to an example embodiment of the present invention. A number of multi-codes and code offset are determined S1. A codeword is formulated that includes a code group indicator and an offset indicator S2. The minimum value of the multi-code number and sixteen minus the multi-code number is obtained S3. A first part of a codeword is determined by subtracting one from the minimum value obtained S4. The first part represents the code group indicator. A second term is determined that equals zero if seven is larger than the multi-code number or one if the multi-code number is larger than seven S5. A fourth term is determined by multiplying the second term by fifteen S6. A third term is determined by subtracting the fourth term from the code offset minus one S7. A second part of the codeword is determined by taking an absolute value of the third term S8. The second part represents the offset indicator. The codeword is formed by concatenating the first part of the codeword with the second part of the codeword S9.

Upon receipt of the codeword, the network device may then have to decode the codeword to determine the number of multi-codes and the code offset. The following details an example possible decoding process according to the present invention where extraction of the number of multi-codes (m) and the code-offset (Δ) from a 7-bit codeword (CW1+CW2) is achieved. Equation 3 may be used to extract a code group indicator from the codeword. Equation 4 may be used to extract a tree offset indicator from the codeword.

$$m=|CW1+1-(CW2\geqq(15-CW1))*16| \quad (3)$$

$$\Delta=|CW2+1-(m\geqq 8)*17| \quad (4)$$

For the example shown above we have $$m=|3+1-(14\geqq 12)*16|=12$$

$$\Delta=|14+1-(12\geqq 7)*17|=2$$

which are the signaled values.

Figure 5:
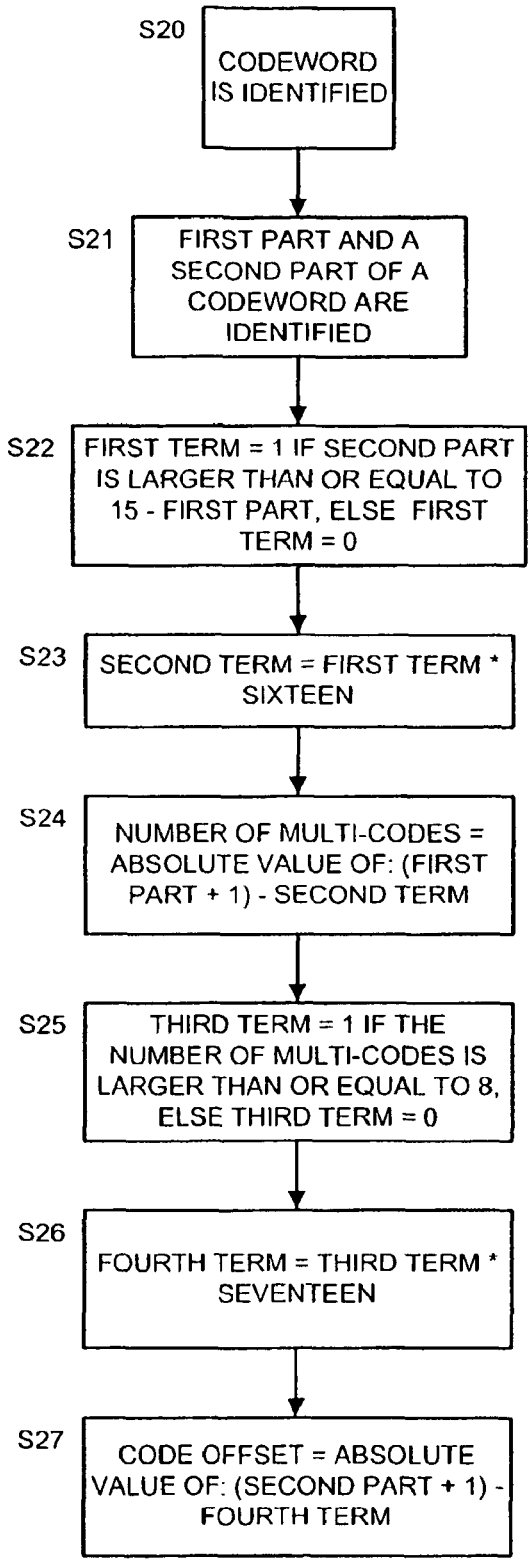
FIG. 5 is a flowchart of an decoding process according to an example embodiment of the present invention.

FIG. 5 shows a flowchart of a decoding process according to an example embodiment of the present invention. A codeword is identified that includes a code group indicator and an offset indicator S20. A first part and a second part of a codeword are identified S21. The first part may represent the code group indicator and the second part may represent the offset indicator. A first term is calculated where the first term equals one if the second part is larger than or equal to the first part subtracted from fifteen, else the first term is equal to zero S22. A second term is determined by multiplying the first term by sixteen S23. The number of multi-codes is determined by taking an absolute value of: the first part plus one minus the second term S24. A third term is determined where the third term equals one if the number of multi-codes is larger than or equal to eight, else the third term equals zero S25. A fourth term is determined by multiplying the third term by seventeen S26. The code offset is determined by taking an absolute value of the second part plus one minus the fourth term S27.

In another encoding embodiment of the present invention, Equation 5 may be used to encode the code group indicator and equation 6 may be used to encode the tree offset indicator.

$$\text{Three first bits: } CW1=\min(m-1,15-m) \quad (5)$$

$$\text{Four last bits: } CW2=|\Delta-1-[m/8]*15| \quad (6)$$

The "min" outside of the parenthesis denotes that the minimum value of the two terms inside the parentheses (separated by a comma) is taken. The symbol "/" denotes division, and the brackets [] denote rounding to the nearest lower integer. The symbol "*" denotes a multiply operation. The two bars | denote that an absolute value is taken of the resultant value of the terms inside the two bars. This encoding embodiment produces the same results, a code-word (CW1 CW2) totaling only seven bits.

The following shows some example computer pseudo language for encoding and decoding according to the present invention. However, encoding and decoding according to the present invention are not limited by these representations.

Encoding:

```
if(m<8)
BEGIN
  CW1=m-1
  CW2=Δ-1
END
else
BEGIN
  CW1=15-m
  CW2=16-Δ
END
Decoding:
m = CW1+1
Δ = CW2+1
if(Δ > 16-m)
BEGIN
  Δ = 16-CW2
  m = 16-(CW1+1)
END
```

In methods for compact representation of multi-code signaling according to the present invention, the encoding and/or the decoding may be implemented in a hardware encoder and decoder respectively, implemented in computer software, implemented in firmware, etc. Moreover, although typically a base station performs the encoding and a network node performs the decoding, a base station and network node may contain either the encoding function or the decoding function, or may contain both.

Methods for compact representation of multi-code signaling according to the present invention is advantageous in that full multi-code flexibility may be maintained such that high HS-DSCH spectral efficiency and RRM flexibility are retained. Moreover, the codeword is self-decodable by network devices, therefore, eliminating the need for a code look-up table, thus saving storage space. Therefore, all parameters may be calculated from the received codeword. Further, being able to transmit the information using less bits saves power and allows use of the used bit(s) for the transmission of other information. The present invention is highly advantageous for supporting HSDPA (High Speed Downlink Packet Access) for WCDMA (Wideband Code Division Multiple Access) where the users spreading factor is set to the fixed number of 16.

It is noted that the foregoing examples have been provided merely for the purpose of explanation and are in no way to be construed as limiting of the present invention. While the present invention has been described with reference to a preferred embodiment, it is understood that the words that have been used herein are words of description and illustration, rather than words of limitation. Changes may be made within the purview of the appended claims, as presently stated and as amended, without departing from the scope and spirit of the present invention in its aspects. Although the present invention has been described herein with reference to particular methods, materials, and embodiments, the present invention is not intended to be limited to the particulars disclosed herein, rather, the present invention extends to all functionally equivalent structures, methods and uses, such as are within the scope of the appended claims.

What is claimed is:

1. A method to provide compact representation of multi-code signaling, the method comprising:

determining, *by a device,* a number of multi-codes;

determining, *by the device,* a code offset; and formulating, *by the device,* a codeword, the codeword comprising a code group indicator of the determined number of multi-codes and an offset indicator of the determined code offset, wherein the formulated codeword comprises a compact representation of multi-code signaling and is decodable without the need for a look-up table, and wherein the codeword is used to assign codes and a code offset to mobile stations.

2. The method according to claim 1, the formulating a codeword further comprising:

determining a first term, the first term comprising a minimum of the multi-code number and sixteen minus the multi-code number;

determining a first part of the codeword by subtracting one from the first term, the first part representing the code group indicator;

determining a second term, the second term equal to zero if seven is larger than or equal to the multi-code number, the second term equal to one if the multi-code number is larger than seven;

determining a third term by calculating a fourth term by multiplying the second term by fifteen and subtracting the fourth term from the code offset minus one;

determining a second part of the codeword by taking an absolute value of the third term, the second part representing the offset indicator; and forming the codeword by concatenating the first part of the codeword with the second part of the codeword.

3. The method according to claim 1, the code group indicator comprising three bits.

4. The method according to claim 1, the offset indicator comprising four bits.

5. A method for decoding a multi-code signaling codeword comprising:

identifying a codeword, the codeword comprising a code group indicator and an offset indicator;

determining a number of multi-codes based on the code group indicator of the codeword; and determining a code offset from the offset indicator of the codeword;

decoding the codeword by providing the number of multi-codes and code offset; and determining the number of multi-codes and corresponding code offset without the need for a look-up table, and wherein the decoded multi-codes and corresponding code offset provides multi codes to a mobile device.

6. The method according to claim 5, the decoding a multi-code signaling codeword comprising:

identifying a first part and a second part of the codeword; the first part representing the code group indicator and the second part representing the offset indicator;

calculating a first term, the first term equal to one if the second part is larger than or equal to the first part subtracted from fifteen, else the first term is equal to zero;

calculating a second term by multiplying the first term by sixteen;

identifying a number of multi-codes by taking an absolute value of the first part plus one minus the second term;

calculating a third term, the third term equal to one if the number of multi-codes is larger than or equal to eight, else the third term is equal to zero;

calculating a fourth term by multiplying the third term by seventeen; and identifying a code offset by taking an absolute value of the second part plus one minus the fourth term.

7. The method according to claim 5, the code group indicator comprising three bits.

8. The method according to claim 5, the offset indicator comprising four bits.

9. A system for compact representation of multi-code signaling comprising:

a network;

a base station connected to the network;

a network device connected to the base station via the network, wherein the base station determines a number of multi-codes and a code offset for use by the network device, the base station encoding the number of multi-codes and code offset into a codeword comprising a compact representation of multi-code signaling, the codeword being encoded by the base station and decoded by the network device without the need for a look-up table.

10. The system according to claim 9, the network comprising a wireless network.

11. The system according to claim 9, the network device comprising a wireless device.

12. The system according to claim 11, the wireless device comprising one of a wireless phone, a portable computer, and a Personal Digital Assistant (PDA).

13. The system according to claim 9, the base station including an encoding function, the encoding function performing:

determining a first term, the first term comprising a minimum of the multi-code number and sixteen minus the multi-code number;

determining a first part of the codeword by subtracting one from the first term, the first part representing a code group indicator;

determining a second term, the second term equal to zero if seven is larger than the multi-code number, the second term equal to one if the multi-code number is larger than seven;

determining a third term by calculating a fourth term by multiplying the second term by fifteen and subtracting the fourth term from the code offset minus one;

determining a second part of the codeword by taking an absolute value of the third term, the second part representing a offset indicator; and forming the codeword by concatenating the first part of the codeword with the second part of the codeword.

14. The system according to claim 13, the encoding function comprising at least one of hardware and software.

15. The system according to claim 9, the remote device including a decoding function, the decoding function performing:

identifying a first part and a second part of the codeword; the first part representing a code group indicator and the second part representing an offset indicator;

calculating a first term, the first term equal to one if the second part is larger than or equal to the first part subtracted from fifteen, else the first term is equal to zero;

calculating a second term by multiplying the first term by sixteen;

identifying a number of multi-codes by taking an absolute value of the first part plus one minus the second term;

calculating a third term, the third term equal to one if the number of multi-codes is larger than or equal to eight, else the third term is equal to zero;

calculating a fourth term by multiplying the third term by seventeen; and identifying a code offset by taking an absolute value of the second part plus one minus the fourth term.

16. The system according to claim 15, the decoding function comprising at least one of hardware and software.

17. A mobile device configured to receive a codeword representing multi-code signaling, the mobile device [configured to] *comprising*:

*a processor and a memory, wherein the processor is configured to* identify a first part and a second part of the codeword; the first part representing a code group indicator and the second part representing an offset indicator;

calculate a first term, the first term equal to one if the second part is larger than or equal to the first part subtracted from fifteen, else the first term is equal to zero;

calculate a second term by multiplying the first term by sixteen;

determine a number of multi-codes by taking an absolute value of the first part plus one minus the second term;

calculate a third term, the third term equal to one if the number of multi-codes is larger than or equal to eight, else the third term is equal to zero;

calculate a fourth term by multiplying the third term by seventeen; and determine a code offset by taking an absolute value of the second part plus one minus the fourth term, wherein the codeword is used to assign codes and a code offset to mobile stations.

18. A method to provide representation of multi-code signaling comprising:

allocating, *by a device,* a number of multi-codes (M) and a code offset (P); and formulating, *by the device,* a codeword, the codeword comprising a code group indicator indicating the number of multi-codes and an offset indicator indicating the code offset, the code group indicator equal to the minimum of M-1 and 15-M, the offset indicator being equal to the absolute value of P-1-((M/8 rounded to the nearest lower integer) multiplied by 15), wherein the codeword comprises seven bits, wherein the codeword is used to assign codes and a code offset to mobile stations.

19. The method according to claim 18, further comprising sending the codeword on a High Speed Shared Control Channel (HS-SCCH).

20. The method according to claim 18, further comprising formulating the codeword without the need for a look-up table.

21. A system for compact representation of multi-code signaling comprising:

a network;

a base station connected to the network;

a network device connected to the base station via the network, wherein the base station determines a number of multi-codes and a code offset for use by the network device, the base station encoding the number of multi-codes and code offset into a codeword comprising a compact representation of multi-code signaling, wherein the codeword is decodable without the need of a look-up, table, and the codeword is used to assign codes and a time offset to the network device.

22. The system according to claim 21, the base station including an encoding function, the encoding function performing:

allocating a number of multi-codes (M) and a code offset (P); and formulating a codeword, the codeword comprising a code group indicator and an offset indicator, the code group indicator equal to the minimum of M-1 and 15-M, the offset indicator being equal to the absolute value of P-1-((M/8 rounded to the nearest lower integer) multiplied by 15), wherein the codeword comprises seven bits.

23. A base station configured to provide representation of multi-code signaling, the base station comprising:

an allocation unit configured to allocate a number of multi-codes (M) and a code offset (P); and a formulation unit configured to formulate a codeword, the codeword comprising a code group indicator indicating the number of multi-codes and an offset indicator indicating the code offset, the code group indicator equal to the minimum of M-1 and 15-M, the offset indicator being equal to the absolute value of P-1-((M/8 rounded to the nearest lower integer) multiplied by 15), wherein the codeword comprises seven bits, wherein the codeword is used to assign codes and a time offset to mobile stations.

24. A network node to provide compact representation of multi-code signaling, the network node [configured to] *comprising*:

*a processor and a memory, wherein the processor is configured to* determine a number of multi-codes;

determine a code offset; and formulate a codeword, the codeword comprising a code group indicator of the determined number of multi-codes and an offset indicator of the determined code offset, wherein the formulated codeword comprises a compact representation of multi-code signaling and decoded without the need for a look-up table, wherein the codeword is used to assign codes and a time offset to mobile stations.

25. A network node to provide representation of multi-code signaling, the network node comprising:

an allocation unit configured to allocate a number of multi-codes (M) and a code offset (P); and a formulation unit configured to formulate a codeword, the codeword comprising a code group indicator indicating the number of multi-codes and an offset indicator indicating the code offset, the code group indicator equal to the minimum of M-1 and 15-M, the offset indicator being equal to the absolute value of P-1-((M/8 rounded to the nearest lower integer) multiplied by 15), wherein the codeword comprises seven bits, wherein the codeword is used to assign codes and a code offset to mobile stations.

*26. A network node, comprising:*

*a processor; and*

*a memory, wherein the processor is configured to*

*determine a number of multi-codes,*

*determine a code offset, and*

*formulate a codeword, the codeword comprising a code group indicator and an offset indicator,*

*wherein the codeword comprises a compact representation of multi-code signaling and is formulated and decoded without the need for a look-up table.*

*27. The network node according to claim 26, wherein the network node comprises a base station or a radio network controller.*

*28. A mobile device comprising:*

*a processor and a memory, wherein the processor is configured to*

*identify a codeword in communication from a network node;*

*identify a code group indicator and an offset indicator from the codeword; and*

*determine a number of multi-codes M and a code offset P from the code group indicator and the offset indicator wherein M and P are integers,*

*wherein the code group indicator is equal to the minimum of M-1 and 15-M, the offset indicator is equal to the absolute value of P-1-((M/8 rounded to the nearest lower integer) multiplied by 15), wherein the codeword comprises seven bits.*

*29. The mobile device according to claim 28, wherein the processor is further configured to receive the codeword on a High Speed Shared Control Channel (HS-SCCH).*

*30. The mobile device according to claim 28, wherein the processor is further configured to decode the codeword without a need for a look-up table.*

*31. A system, comprising:*

*a network node; and*

*a network device operably connected to the network node,*

*wherein the network node is configured to*

*determine a number of multi-codes,*

*determine a code offset, and*

*formulate a codeword, the codeword comprising a code group indicator and an offset indicator, wherein the codeword comprises a compact representation of multi-code signaling and is formulated and decoded without the need for a look-up table.*

*32. A network node, comprising:*

*a processor; and*

*a memory, wherein the processor is configured to*

*allocate a number of multi-codes M and a code offset P wherein M and P are integers; and*

*formulate a codeword, the codeword comprising a code group indicator and an offset indicator, the code group indicator equal to the minimum of M-1 and 15-M, the offset indicator being equal to the absolute value of P-1-((M/8 rounded to the nearest lower integer) multiplied by 15), wherein the codeword comprises seven bits.*

*33. The network node according to claim 32, wherein the network node comprises a base station or a radio network controller.*

*34. A system, comprising:*

*a network node; and*

*a network device operably connected to the network node,*

*wherein the network node is configured to*

*allocate a number of multi-codes M and a code offset P wherein M and P are integers; and*

*formulate a codeword, the codeword comprising a code group indicator and an offset indicator, the code group indicator equal to the minimum of M-1 and 15-M, the offset indicator being equal to the absolute value of P-1-((M/8 rounded to the nearest lower integer) multiplied by 15), wherein the codeword comprises seven bits.*

*35. An apparatus, comprising:*

*a processor and a memory, wherein the processor is configured to*

*identify a first part and a second part of a codeword, the first part representing a code group indicator and the second part representing an offset indicator;*

*calculate a first term, the first term equal to one if the second part is larger than or equal to the first part subtracted from fifteen, else the first term is equal to zero;*

*calculate a second term by multiplying the first term by sixteen;*

*identify a number of multi-codes by taking an absolute value of the first part plus one minus the second term;*

*calculate a third term, the third term equal to one if the number of multi-codes is larger than or equal to eight, else the third term is equal to zero;*

*calculate a fourth term by multiplying the third term by seventeen; and*

*identify a code offset by taking an absolute value of the second part plus one minus the fourth term.*

* * * * *